A. J. SEAMAN.
TIRE VALVE.
APPLICATION FILED DEC. 5, 1911.
1,113,375.
Patented Oct. 13, 1914.
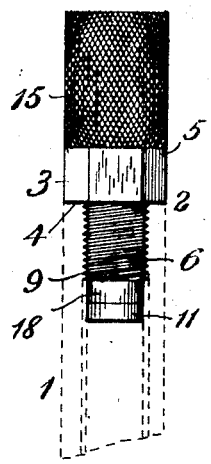
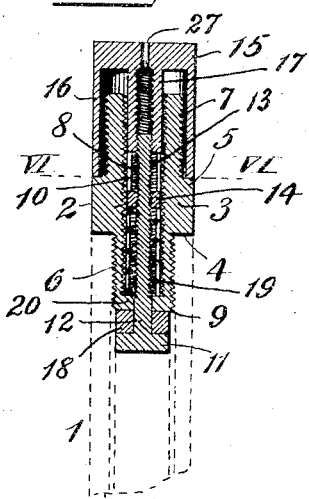
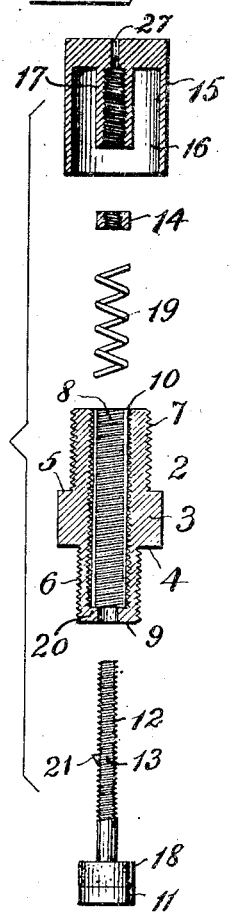
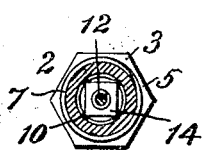
WITNESSES
INVENTOR
Albert J. Seaman
by N. N. Low Attorney

UNITED STATES PATENT OFFICE.

ALBERT J. SEAMAN, OF DORCHESTER, MASSACHUSETTS, ASSIGNOR OF ONE-THIRD TO THOMAS P. BORDEN, OF BOSTON, MASSACHUSETTS, AND ONE-THIRD TO EDWARD M. ROBINSON, OF CAMBRIDGE, MASSACHUSETTS.

TIRE-VALVE.

1,113,375.   Specification of Letters Patent.   Patented Oct. 13, 1914.

Application filed December 5, 1911. Serial No. 664,085.

*To all whom it may concern:*

Be it known that I, ALBERT J. SEAMAN, a citizen of the United States, residing at Dorchester, in the county of Suffolk and State of Massachusetts, have invented new and useful Improvements in Tire-Valves, of which the following is a specification.

My invention relates to improvements in pneumatic valves for vehicle tires, and other purposes, in which the valve is contained within a nipple or tube-section which is distinct and separable from the ordinary air tube, usually fixedly attached to the tire or to the inner tube of the tire; whereby such nipple, with the valve and its related parts, may be removed from the fixed air tube, for adjustment or repair of the valve, without the necessity of removing the inner tube from the wheel or separating the fixed air tube from the inner tire tube.

In order to make the invention more clearly understood I have shown in the accompanying drawings means for carrying the same into practical effect, without limiting the improvements, in their useful applications, to the particular constructions which, for the purpose of illustration, I have delineated.

In the said drawings Figure 1 is a side view of a pneumatic valve embodying my improvements, the air tube of the tire being shown in dotted lines. Fig. 2 is a vertical longitudinal section of the same. Fig. 3 is a view part in side elevation and partly in section of the parts composing the pneumatic valve separated from each other or disassembled. Fig. 4 is a cross-section on line VI—VI of Fig. 2.

The drawings show the parts enlarged to about twice the natural size, for the purpose of greater distinctness.

Referring to the said drawings, 1 indicates the air tube of the tire which is, or may be, permanently attached to the tire. This tube may be of metal secured to the tire, or to the inner tube thereof, in a known manner; or it may be of rubber vulcanized to the tire.

2 is the nipple having a middle enlarged portion 3 which is flattened or nut-shaped so that it may be turned by a wrench. The portion 3 presents an inner shoulder 4 to the end of the air tube and an outer shoulder 5 to the inner end of the cap flange. The inner part of the nipple tube is suitably shaped to engage with the air tube. To engage a metal air tube it is provided with a screw thread as shown at 6, which will engage with a corresponding thread on the air tube. The outer part of the nipple tube is screw threaded exteriorly as shown at 7 and interiorly as shown at 8 to properly engage either of the two usual forms of pump tube coupling. The nipple tube is formed at its inner extremity, or within the tube at a suitable point, with a valve seat 9. The outer part of the nipple tube is interiorly formed so as to engage and prevent the turning of the valve stem nut, hereinafter mentioned; an example of such interior formation is illustrated, which consists in a partial squaring of the interior of the tube as shown at 10, leaving however an efficient extent of the screw thread 8.

11 is the valve arranged to engage the valve seat 9 and having a stem 12 which extends outwardly into and nearly through the outer part of the nipple tube. This stem is screw threaded as shown at 13 and engages a nut 14 within the nipple, which nut is held from turning by the formation 10.

15 is the cap which may be entirely closed at its outer end, and is formed with a flange 16 which incloses the outer part of the nipple and abuts against the shoulder 5. The cap is further formed with a tube 17 which is centrally arranged within the flange 16 and is adapted to enter within the nipple. It is interiorly screw threaded to engage upon the valve stem, so that, by screwing the cap inward the valve will be drawn forcibly upon its seat 9. Packings of rubber or other suitable material may be provided at all joints, if desired. One such packing is shown at 18 between the valve and its seat.

19 is a spring resting upon a shoulder 20 within the inner end of the nipple and engaging the under side of the nut 14. This spring acts to press the valve, without too much force, against its seat. The valve may be opened, after the removal of the cap 15, by pressing inward upon the outer end of the valve stem, thereby permitting the exhaust of air from the tire.

21 is a stop which is or may be employed to regulate the distance to which the valve stem is screwed into the nut 14. It is preferably formed on the valve stem as shown. When the stem is screwed sufficiently into the nut, to give the spring that tension which holds the valve properly on its seat, the stop 21 comes in contact with the under side of the nut and the parts are held in the desired relative position.

The entire device, as a unitary article, may be attached to the air tube, or removed therefrom for repair or renewal of the valve. The cap 15 may have an opening 27 for the escape of air, to allow which the cap is screwed a little way outward on the valve stem and then pressed inward to release the valve from its seat. The stem 12 is not fitted air-tight in the surrounding part 17, so that the air can escape as described.

What I claim is:—

1. In a valve for tires, the combination of a nipple adapted to be attached to a tire air tube the said nipple being provided with a valve seat and a spring-supporting shoulder, a valve having a screw threaded stem, a cap engaging such stem to draw the valve to its seat, and a nut on said stem and within the nipple for holding the spring under the desired tension, the nipple having its interior squared for preventing the rotation of the nut, substantially as set forth.

2. In a valve for tires, the combination of a nipple adapted to be attached to a tire air tube the said nipple being provided with a valve seat and a spring-supporting shoulder, a valve having a screw threaded stem, a cap engaging such stem to draw the valve to its seat, a nut on said stem for holding the spring under the desired tension, and a stop 21 on the valve stem and projecting outward therefrom for limiting the distance to which the stem may be screwed in to the nut, thereby limiting the tension of the spring, substantially as set forth.

3. In a valve for tires, the combination of a nipple adapted to be attached to a tire air tube, the said nipple being provided with a valve seat and a spring supporting shoulder, a valve having a screw threaded stem, a cap engaging such stem to draw the valve to its seat, a nut on said stem and within the nipple for holding the spring under the desired tension, and a positive stop on the valve stem for limiting the longitudinal movement of the nut on the valve stem, the nipple having independently of the cap means for preventing the rotation of the nut, substantially as set forth.

In testimony whereof I have hereunto set my hand in presence of two subscribing witnesses.

ALBERT J. SEAMAN.

Witnesses:
 THOS. P. BORDEN,
 JEREMIAH S. SULLIVAN.